US008291401B2

(12) United States Patent
Gray et al.

(10) Patent No.: US 8,291,401 B2
(45) Date of Patent: Oct. 16, 2012

(54) PROCESSING SYMBOLS ASSOCIATED WITH SHARED ASSEMBLIES

(75) Inventors: Michael W. Gray, Guanaba (AU);
Alexander J. Hennekam, Gold Coast (AU); Peter R. Horner, Varsity Lakes (AU); Simon D. McMahon, Burleigh Waters (AU); Michael J. Thomas, Bonogin (AU); Peter T. Waltenberg, Robina (AU)

(73) Assignee: International Business Machines Corporation, Armonk, NY (US)

( * ) Notice: Subject to any disclaimer, the term of this patent is extended or adjusted under 35 U.S.C. 154(b) by 1015 days.

(21) Appl. No.: 12/187,925

(22) Filed: Aug. 7, 2008

(65) Prior Publication Data

US 2010/0037208 A1 Feb. 11, 2010

(51) Int. Cl.
*G06F 9/44* (2006.01)
*G06F 9/445* (2006.01)
(52) U.S. Cl. .................... 717/162; 717/122; 717/163
(58) Field of Classification Search .......... 717/162–166, 717/140–143, 121–123
See application file for complete search history.

(56) References Cited

U.S. PATENT DOCUMENTS

| 5,410,701 | A  | * | 4/1995  | Gopalraman ............... 717/142 |
| 5,481,712 | A  | * | 1/1996  | Silver et al. ................. 717/109 |
| 5,493,682 | A  | * | 2/1996  | Tyra et al. .................. 717/122 |
| 6,149,318 | A  | * | 11/2000 | Chase et al. ................ 717/131 |
| 6,185,733 | B1 | * | 2/2001  | Breslau et al. .............. 717/163 |
| 6,800,155 | B2 | * | 10/2004 | Senecal et al. .............. 156/62.4 |
| 6,871,344 | B2 | * | 3/2005  | Grier et al. ................. 717/162 |
| 6,976,037 | B1 |   | 12/2005 | D'Souza et al. |
| 7,073,170 | B2 | * | 7/2006  | Grier et al. ................. 717/162 |
| 7,143,164 | B2 | * | 11/2006 | Antonov et al. ............. 709/225 |
| 7,162,711 | B2 |   | 1/2007  | Czajkowski et al. |
| 7,287,259 | B2 | * | 10/2007 | Grier et al. ................. 719/331 |
| 7,428,726 | B1 | * | 9/2008  | Cowan et al. ............... 717/122 |
| 7,533,376 | B2 | * | 5/2009  | Anwar et al. ............... 717/162 |
| 7,685,589 | B2 | * | 3/2010  | Trowbridge ................. 717/166 |
| 7,694,291 | B2 | * | 4/2010  | Chen et al. ................. 717/162 |
| 7,840,942 | B2 | * | 11/2010 | Duffield et al. ............. 717/121 |
| 7,860,823 | B2 | * | 12/2010 | Hejlsberg et al. ........... 707/603 |
| 7,945,905 | B2 | * | 5/2011  | Kumar et al. ............... 717/143 |
| 8,151,245 | B2 | * | 4/2012  | Oberlin et al. .............. 717/121 |
| 2006/0037011 | A1 |   | 2/2006  | Shi et al. |

OTHER PUBLICATIONS

Ohst et al, "A fine grained version and configuration modle in analysis and design", IEEE ICSM, pp. 1-7, 2002.*
Ren et al, "Software configuration management and version control study based on baseline", IEEE, pp. 118-121, 2010.*

(Continued)

*Primary Examiner* — Anil Khatri
(74) *Attorney, Agent, or Firm* — DeLizio Gilliam, PLLC (57) ABSTRACT

In some embodiments, an apparatus can comprise a memory unit including, two or more assemblies, wherein the two or more assemblies include a first assembly and a second assembly, wherein the second assembly is a later version of the first assembly, and wherein the first and second assemblies include, a stub module configured to detect an assembly initialization request indicating one of the first or second assemblies. The stub module can also be configured to retrieve a reference to a symbol table associated with the one of the first and second assemblies indicated in the assembly initialization request, to store data in the symbol table, and to provide the reference to a caller. The memory unit can also comprise an implementation module configured to perform operations associated with symbols in the symbol table and a processor configured to receive and execute one or more of the stub and implementation modules.

17 Claims, 7 Drawing Sheets

OTHER PUBLICATIONS

Hicks et al, "Dynamic software updating", ACM Trans. on Prog. Lang. and Sys. vol. 27, No. 6, pp. 1049-1096, 2005.*

Merritt et al, "Shadowfax: Scaling in heterogenous cluster systems via GPGPU assemblies", ACM VTD, pp. 3-10, 2011.*

Pronio, Mary Jane et al., "Can two different versions of DB2 Connect be installed on one machine?" *IT Community Bytes*, http://www.thescripts.com/forum/thread182180.html (obtained May 15, 2008),(Nov. 12, 2005).

Guthrie, Scott et al., "Common Gotcha: Slow VS 2005 Web Site Build Performance Because of Å?Dueling Assembly ReferencesÅ?", *Scott Gu's Blog*, http://weblogs.asp.net/scottgu/archive/2006/07/30/Common-Gotcha__3A00__-Slow-VS-2005-Web-Site-Build-Performance-Because-of-__1C2O__Dueling-Assembly-References__1D20__.aspx,(Jul. 30, 2006).

D'Souza, David et al., "Implementing Side-by-Side Component Sharing in Applications (Expanded)", *Microsoft Developer Network*, http://msdn.microsoft.com/en-us/library/ms811700.aspx (obtained May 15, 2008),(Nov. 1999).

"Concepts of Isolated Applications and Side-by-side Assemblies", *Visual C++ Developer Center*, http://msdn.microsoft.com/en-us/library/ms235531.aspx (obtained May 15, 2008),(2008).

Drepper, Ulrich "How to Write Shared Libraries", http://people.redhat.com/drepper/dsohowto.pdf,(Aug. 20, 2006).

* cited by examiner

PROCESSING SYMBOLS ASSOCIATED WITH SHARED ASSEMBLIES

BACKGROUND

1. Technical Field

Embodiments of the inventive subject matter generally relate to the field of computer software, and more particularly, to techniques for enabling multiple versions of a shared assembly to co-reside in a single UNIX™ process.

2. Background

In a UNIX environment, an application can use a shared assembly by linking against the assembly at compile time or by loading the shared assembly at runtime. When components in the application use different versions of the same shared assembly, a loader can identify symbols with the same name in different assembly versions and treat them differently depending on the shared assembly's location, name, and/or version number. In some instances, the application's dependency on different shared assembly versions may lead to incompatible symbol resolutions and cause errors. Thus, after a symbol is stored in the global symbol table, it becomes the process-wide reference for all other symbols with the same name.

SUMMARY

In some embodiments, an apparatus can comprise a memory unit including, two or more assemblies, wherein the two or more assemblies include a first assembly and a second assembly, wherein the second assembly is a later version of the first assembly, and wherein the first and second assemblies include, a stub module configured to detect an assembly initialization request indicating one of the first or second assemblies. The stub module can also be configured to retrieve a reference to a symbol table associated with the one of the first and second assemblies indicated in the assembly initialization request, to store data in the symbol table, and to provide the reference to a caller. The memory unit can also comprise an implementation module configured to perform operations associated with symbols in the symbol table and a processor configured to receive and execute one or more of the stub and implementation modules.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. In some instances, well-known instruction instances, protocols, structures, and techniques have not been shown in detail in order not to obfuscate the description.

Introduction

Shared assemblies are libraries that include logic and data that provides functionality to applications. Shared assemblies can be accessed by one or more applications, and loaded and executed when the application is run. Shared assemblies may exist as functions, data files, executables (.exe files), binary files, etc., and they may allow applications to share code and data. Applications can use shared assemblies to develop software or perform operations in accordance with the functionality provided by the shared assembly. For example, a shared library can provide functionality to perform various math functions. Applications typically initialize shared assemblies (e.g., a collection of functions that an application can load and use) by—1) linking shared assembly dependencies at compile time, or 2) loading shared assemblies at runtime. In the first instance, the application can be linked against a shared assembly at compile time. The shared assembly dependency is initially stored as part of the application (e.g., when the application is programmed). When the application is loaded, a loader (i.e., a part of a kernel in an operating system responsible for loading programs into memory and executing them) retrieves the specified shared assembly. In the second instance, the application "knows" which assembly it requires for proper functioning (e.g., the assembly information can be part of the application's internal code). At runtime, the application can open the specified shared assembly by making a system call to retrieve the shared library, and loading it into the application's process space.

Typically, before shared assemblies are executed, system symbol tables must be initialized to include symbols associated with the shared assembly. In general (e.g., in a UNIX system), during initialization, a system loader can search for a specified shared assembly, locate a specified symbol within the shared assembly, and pass the symbol (e.g., function identifier, sub-routine identifier, variable, etc.) into a system symbol table. These assembly symbols, loaded into global space, typically become the unique definition of those symbols for the entire program, regardless of the path or name of the shared assembly in which the symbols reside. Thus, when an application (or component) calls the symbol, the kernel looks-up the symbol in the symbol table and facilitates the symbol call. However, different versions of the same shared assembly, which may be stored in different locations, may have the same symbol name. If components in the application use different versions of a shared assembly, the loader can include logic to identify symbols with the same name in the different versions and treat them differently depending on the assembly's location, name, and/or version number. However, the application's dependency on different shared assembly versions may lead to incompatible symbol resolutions and cause errors.

Figure 1:
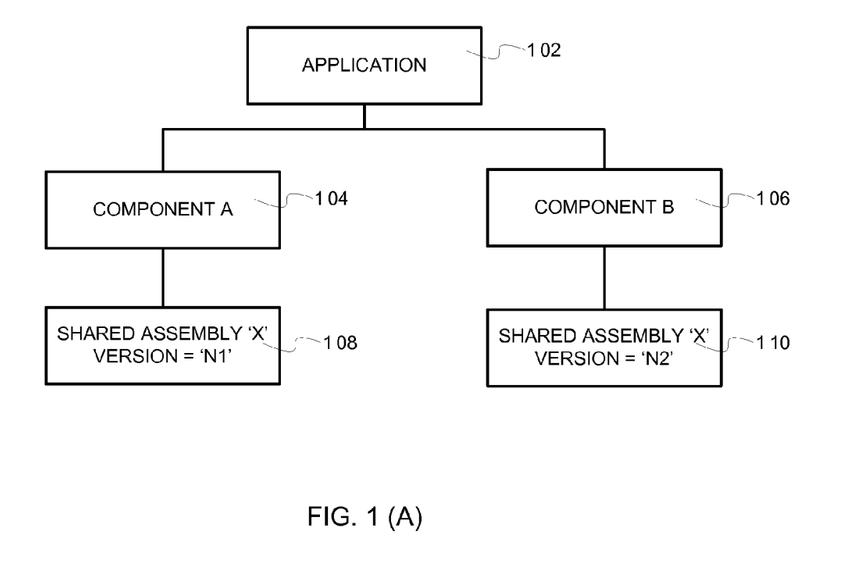
FIG. 1A is a block diagram illustrating different versions of a shared assembly existing concurrently in a single process.
FIG. 1B is a block diagram illustrating an application and its components using different versions of a shared assembly.

Symbol resolution can include dereferencing a reference (e.g., pointer, memory address, etc.) associated with one or more symbols. Although the loader identifies and passes, to the symbol table, different symbols with the same name, if the symbol table manager (e.g., the kernel module) determines that a symbol with the same name has already been encountered in another file (e.g., shared assembly), and stored in the symbol table, it may try to determine which of the two symbols are valid (ignoring that the symbol came from a totally different assembly from the first definition) and discard the "incorrect" symbol. Thus, the link between symbols with the same name within different shared assemblies is lost. After the "valid" symbol is stored in the global symbol table, all subsequent symbols with the same name are discarded, and the symbol stored in the global symbol table is used instead, leading to data corruption, errors in the program, etc. The following discussion describes how multiple shared assembly dependencies can result in complex and incompatible symbol resolutions within a UNIX environment. FIGS. 1A and 1B describe different scenarios that can lead to incompatible symbol resolutions.

FIG. 1A is a block diagram illustrating different versions of a shared assembly operating concurrently in a single process. In FIG. 1A, a UNIX application 102 includes two components—component A (104) and component B (106). Each of these components uses different versions of the same shared assembly. For example, component A (104) uses version N1 (108) of the shared assembly X, while component B (106) uses version N2 (110). A component can be an element with a defined functionality and with the ability to interact with other components. Components can include functions, subroutines, objects, etc. FIG. 1A also assumes that multiple instances of the shared assembly are installed on a system and that the application 102 has the required configuration or installation procedures so that each component can access the correct version of shared assembly with which it is configured to operate.

Depending on the timing and method of symbol resolution, it is possible for component A (or component B) to unknowingly resolve some of shared assembly X's symbols from version "N1" and others from version "N2". In some instances, different versions of the same shared assembly can include symbols (with the same name) providing slightly different functionality. For error-free operation, the kernel needs to have the ability to keep track of all the symbols in the various shared assembly versions. As described earlier, current processes may discard one or more of the symbol definitions if application components request symbols, with the same name, from different shared assembly versions. If a symbol is discarded, some of its unique functionality may be also lost. In FIG. 1A, because symbols in assembly X-version N1 and assembly X-version N2 are resolved into global space, the application 102 can exhibit unexpected behavior. In some instances, assembly X-version N2 may have functions that are dependent on all other functions executed in X-version N2. For example, all functions in X-version N2 may increment a global counter used for garbage collection. If a function in X-version N1 is mistakenly used in lieu of a function in X-version N2, the global counter may not be incremented and garbage collection may occur while the object of interest is still in use.

A solution to the problem in FIG. 1A is to design components A and B to resolve the shared assembly's symbols into local scope only, thus ensuring that the components only see the version of the assembly that they require. However, this solution may fail if components A and B come from competing uncooperative vendors or if the application also uses shared assembly X. FIG. 1B is a block diagram illustrating an application and its components using different versions of a shared assembly. In FIG. 1B, the application includes two components (A and B), both of which use different versions of the same shared assembly, as described earlier. As shown, the application itself explicitly loads (or is linked against) version "N2" of the shared assembly X. Hence, all the symbols loaded by the application take precedence over the symbols loaded by either component A or B even though components A and B resolve the shared assembly's (X's) symbols locally.

Thus, users may want a system that allows them to use different versions of a shared assembly without having to deal with errors caused due to incompatible symbols in multiple versions of the shared library. Some embodiments of the inventive subject matter describe a system that ensures that multiple unique instances of the shared assembly can be loaded into a single process space regardless of the implicit or explicit dependencies of the consuming component. The following discussion describes this and other features in greater detail.

Example Shared Assembly Architecture

A solution to resolve problems occurring when an application's components access different versions of the same shared assembly includes exposing an abstract interface of the shared assembly to the consuming component while hiding the symbols that provide the specific version dependant implementation. In other words, the authors of the shared assembly must split their implementation into two pieces, one that exposes the Application Program Interface (API) to the consumer (this piece may be referred to as an assembly stub) and the other that implements the actual functionality for the specific version of the shared assembly (also known as assembly implementation). The assembly stub that exposes the API acts as a pure virtual proxy passing consumer calls down to the hidden symbols that contain the specific implementation.

FIG. 2A is a block diagram illustrating the concept of splitting a shared assembly to resolve erroneous symbol resolutions while using different versions of a shared assembly in a single process, according to some embodiments of the invention. As explained earlier, the shared assembly includes two segments—1) an assembly stub 204 and 2) an assembly implementation 206. The assembly stub 204 is a top-level proxy and includes symbols from the shared assembly that application consumer components 202 call and implement. The assembly stub 204 (refer to FIG. 2B) includes only the symbol's definition and does not include the symbol's functionality. The assembly implementation 206 (refer to FIG. 2C) includes the real implementation (e.g., logic to perform the symbol's function) of the shared assembly's symbols.

In some embodiments, the assembly stub 204 can export the symbols that the consumer component is permitted to utilize either implicitly (e.g., by linking against at compile time) or explicitly (e.g., via a function call). FIG. 2B depicts an example assembly stub. The assembly stub 204 is the published part of the shared assembly (i.e., the part of the shared assembly that the application knows about). The assembly stub 204 includes an initialization function which application consumer components 202 must call (to initialize the assembly) prior to making any other symbol call. The calling component can optionally pass, as a parameter to the initialization function, a string indicating the version of the shared assembly it would like to use. If the component passes "NULL" as a parameter, the assembly stub 204 retrieves the latest available shared assembly version. In some instances, the initialization function returns a pointer to the calling component. The calling component 202 can pass this pointer (handle) as a parameter into each subsequent API call to indicate the version of the shared assembly it wants to use.

In some instances, the application consumer components 202 may be integrated into different products where each of the products may be tested against a specified version of the components. The product may continue to use the old version of the shared assembly even after newer versions are released simply because the components were implemented with and tested against the older version and rewriting or modifying the entire product to cater to the new version of the shared assembly may not be feasible. In other instances, the application can comprise of different parts, developed separately at different locations, using different versions of the shared assembly, and integrated together at a customer's site. The assembly stub handle (from the initialization function) can define the location of the specified version of the shared assembly implementation. Thus, the role of the shared assembly initialization function is to provide the function mapping between the publicly visible shared assembly proxy functions 204 and their private (hidden) real, version-specific implementations 206. Each function in the assembly stub 204 takes this handle as one the function parameters and passes the request to the correct version of the assembly's implementation 206.

In one embodiment, for every release (version) of the assembly implementation 206, the exported symbols are namespaced such that no two releases of the assembly can export identical symbol names. Namespacing is a technique by which an item can be associated with an identifier, thus allowing disambiguation of different items with the same name residing in different namespaces. Namespacing can be achieved manually (e.g., via build time macros) and/or using C++ via namespaces. In the assembly implementation 206, the shared assembly's filename can be used to determine the namespace value of the contained symbols (namespaced symbols). FIG. 2C illustrates this concept of using namespaces to differentiate between symbols with the same name in different versions of a shared assembly, according to some embodiments of the invention. The shared assembly "libdogoodwork.so" has two versions—2.12 and 2.64. In the example in FIG. 2C, the version numbers are used to namespace and identify the assembly version to which the symbol belongs.

Example Assembly Stub Operations

The following sections describe operations associated with some embodiments of the invention. In some embodiments, the operations can be performed by logic not described in the block diagrams; furthermore, some embodiments can perform more or less than the operations shown in any flow diagram. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments; one or more of the operations can be performed in parallel.

Assembly Stub Initialization

Figure 2:
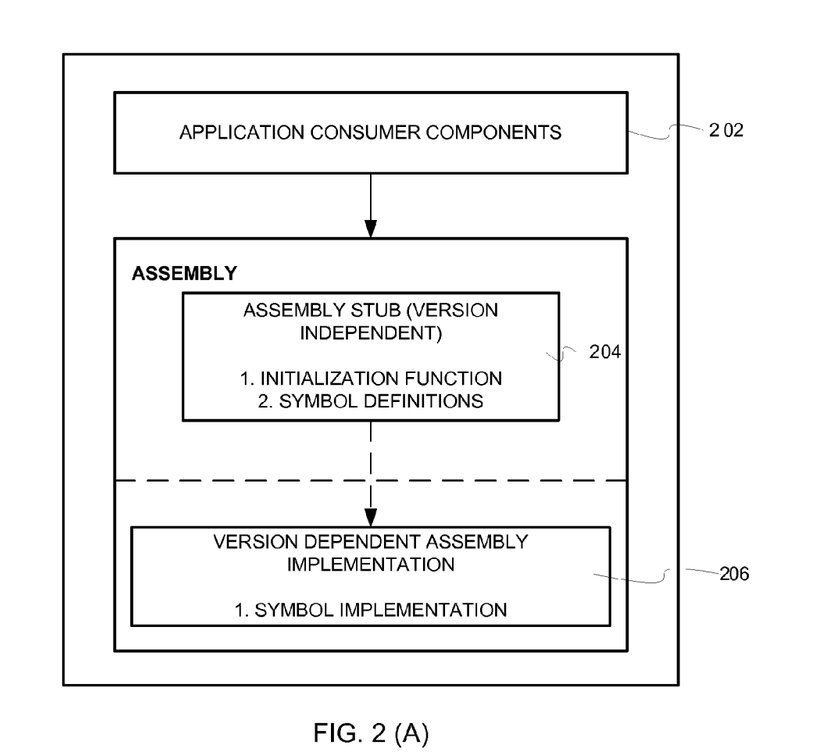
FIG. 2A is a block diagram illustrating the concept of splitting a shared assembly to resolve erroneous symbol resolutions while in different versions of a shared assembly in a single process, according to some embodiments of the invention.
FIG. 2B illustrated an example assembly stub, according to some embodiments of the invention.
FIG. 2C illustrates the concept of using namespaces to differentiate between symbols with the same name in different versions of a shared assembly, according to some embodiments of the invention.
Figure 3:
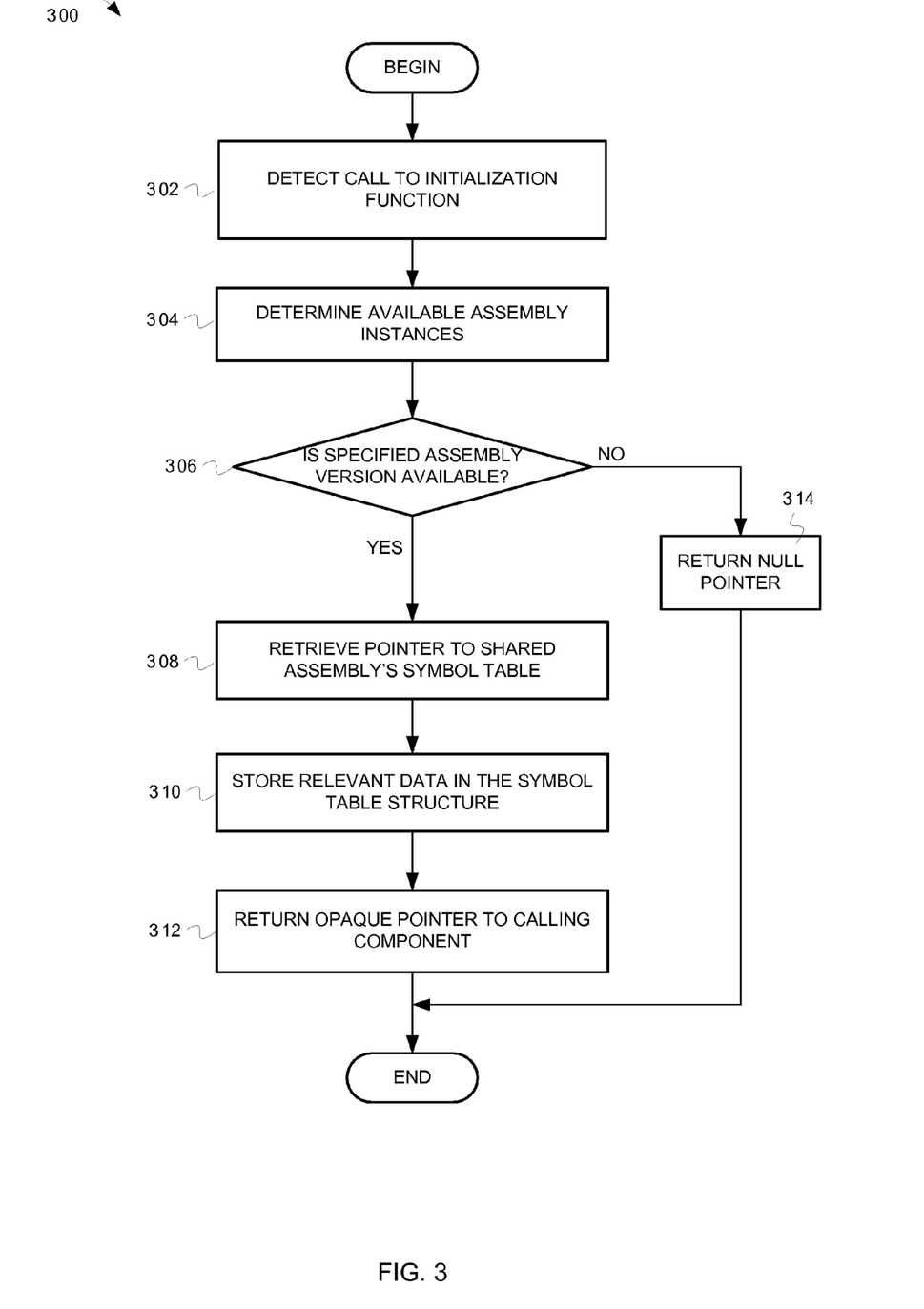
FIG. 3 is a flow diagram illustrating operations for assembly stub initialization, according to some embodiments of the invention.

The role of an assembly stub's initialization function is to provide a mapping between publicly visible shared assembly proxy functions (refer to FIG. 2B) and their private, version-specific implementations (refer to FIG. 2C). Assembly stub initialization is a process, which enables an application (or components in an application) to use different versions of a shared assembly while eliminating the possibility of erroneously using functions from different shared assembly versions. Assembly stub initialization forces calling components to specify, either implicitly (passing a null parameter) or explicitly (passing the assembly version number), a version number of the shared assembly that the component wants to use. The output of the assembly stub initialization function is a handle, which defines the location of a structure containing references to symbols in the requested version of the shared assembly implementation. The assembly stub can use the handle to locate the correct version of the shared assembly and pass the symbol request to the requested symbol's implementation, thus avoiding confusion between symbols in different versions of the same shared assembly. FIG. 3 is a flow diagram illustrating operations for assembly stub initialization, according to some embodiments of the invention. The following discussion will describe the flow 300 with reference to the system of FIG. 2. The flow diagram 300 begins at block 302.

Figure 4:
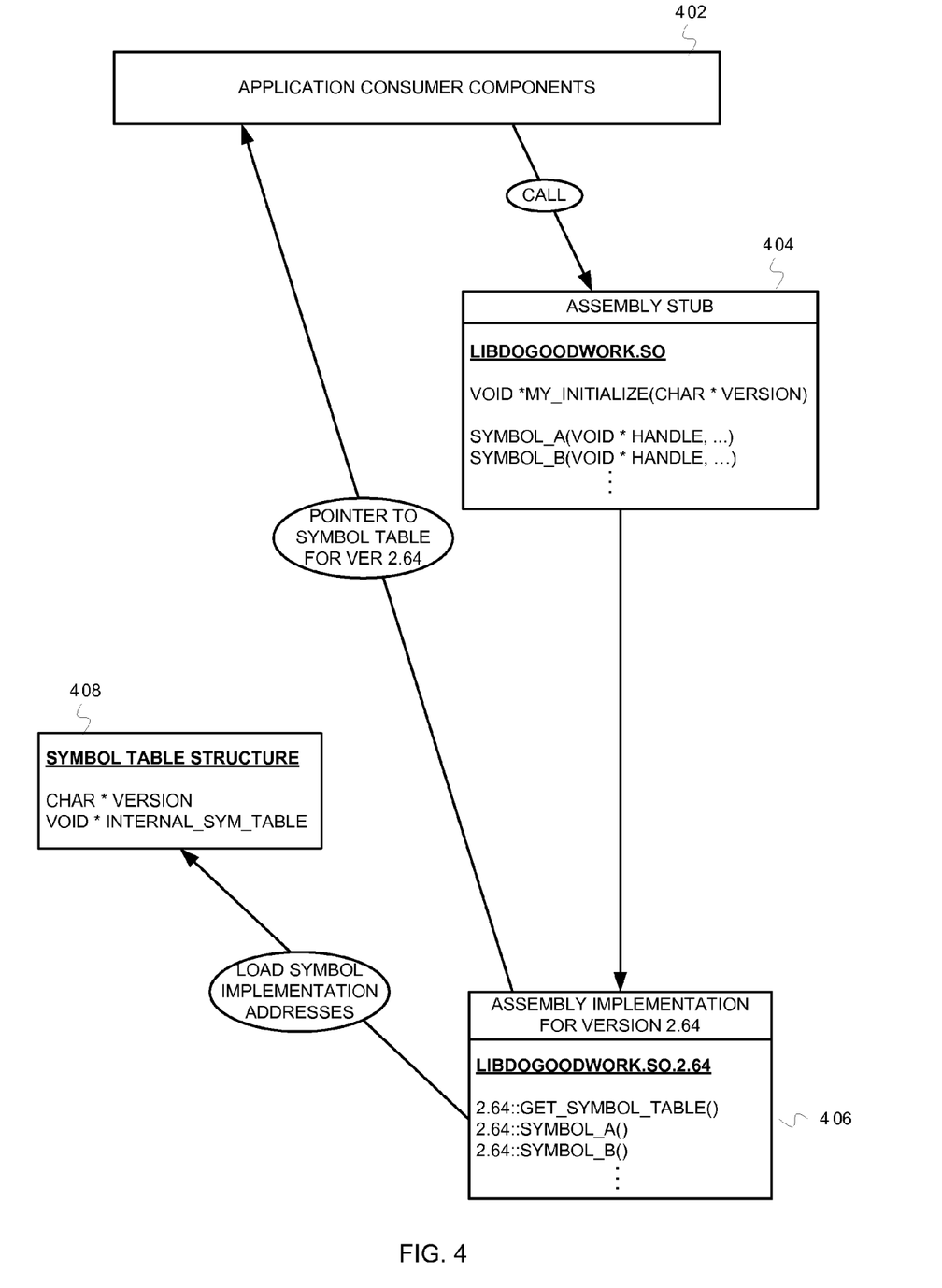
FIG. 4 is a conceptual diagram illustrating operations for assembly stub initialization, according to some embodiments of the invention.

At block 302, an assembly stub 204 detects a call to the stub's initialization function. The application consumer components 202 can call the initialization function to initialize the shared assembly prior to making other symbol calls. In some instances, the application consumer components 202 can include the shared assembly version number as a parameter in the call to the assembly stub's initialization function. In other instances, the application may not pass a version parameter, but instead pass "NULL" as a parameter. This is illustrated in FIG. 4, where the application consumer component 402 makes an initialization call to the assembly stub "libdogoodwork.so" 404. For example, if the application consumer component 402 wants to use assembly version "2.64", the function call may be of the form, "my_initialize (2.64)". Referring back to FIG. 3, the flow continues at block 304.

At block 304, the assembly stub 204 determines the available shared assembly versions. In some instances, the assembly stub 204 can perform a general system search to locate different versions of the shared assembly. In other instances, the assembly stub 204 can perform a search on a specified path (e.g., LD_LIBRARAY_PATH) for all instances of the assembly implementation with the same base name (e.g., by ignoring the version part of the shared assembly name). The flow continues at block 306.

At block 306, the assembly stub 204 determines whether the assembly version requested by the application consumer component 202 is available. The assembly stub 204 uses the version part (e.g., version name and number) of the shared library names determined at block 304 and the version information passed as a parameter to the initialization function at block 302 to determine whether the specified assembly version is available on the system. If the calling component has no preference (e.g., passes NULL as the version parameter), the assembly stub 204 determines and loads the latest version of the shared assembly. If the assembly stub finds the specified shared assembly version, the flow continues at block 308. Otherwise, the flow continues at block 314.

At block 308, the assembly stub 204 retrieves a pointer to the shared assembly's symbol table. The assembly stub 204 can use "dlopen( )" (a UNIX system function to open a shared assembly) to open the specified shared assembly implementation at runtime and load it into the processor. The assembly stub 204 can then use "dlsym( )" to acquire a pointer to a filled-in function table structure for the real implementation symbols. The assembly stub's initialization function knows that the names are exported in the form "<namespace><base function name>", where namespace can be determined from the assembly implementation filename, and therefore can determine the specified symbols. As shown in FIG. 4, the assembly stub 404 finds the specified version of the shared assembly ("libdogoodwork.so.2.64") 406, where the shared assembly includes namespaced symbols. Thus, to determine the function pointer for get_symbol_table( ), the initialization function passes, to dlsym( ), the lookup string "2.64:: get_symbol_table". Referring back to FIG. 3, the flow continues at block 310.

At block 310, the assembly stub 204 stores relevant data in the symbol table structure. This symbol table structure may be a local structure, typically part of the assembly stub, and may be distinct from the global symbol table structure within the kernel. The assembly stub 204 can make a call to get_symbol_table( ) via the function pointer (determined at block 308) and retrieve a filled-in function pointer structure for the implementation assembly. This function pointer structure can include information (e.g., pointers, locations in memory, etc.) associated with the symbol's real implementation, and is placed in an internal symbol table. In FIG. 4, the shared assembly's symbol table structure 408 includes the shared assembly's version information (e.g., version number) and the internal symbol table structure. In some instances, the assembly stub 204 can populate the internal symbol table with function pointers corresponding to the real implementation of the shared assembly symbols. Referring back to FIG. 3, the flow continues at block 312.

At block 312, the assembly stub 204 returns, to the calling component, a pointer. The pointer is a reference to the symbol table structure (created at block 310) for the specified version of the shared assembly's implementation. In some instances, the pointer cannot be dereferenced, provides no identifying information to the application consumer components, and therefore is opaque. In FIG. 4, the initialization function (my_initialize( )) returns a pointer to the symbol table structure 408 for the implementation of shared assembly version 2.64. Typically, the symbol table structure and the pointer to the symbol table structure are maintained within the assembly stub. Referring back to FIG. 3, the flow ends.

At block 314, the assembly stub 204 returns a NULL pointer to the calling application consumer component. The flow 300 moves to block 314 from block 306, when the assembly stub 204 cannot find a shared assembly with the caller's version preference resulting in a failed initialization call. From block 314, the flow ends.

Symbol Call Operations after Assembly Stub Initialization

After a component (or an application) initializes the requested shared assembly version and receives a reference to the symbol table for the requested version of the shared assembly, a component can use the following operations to access a shared assembly's symbol.

Figure 5:
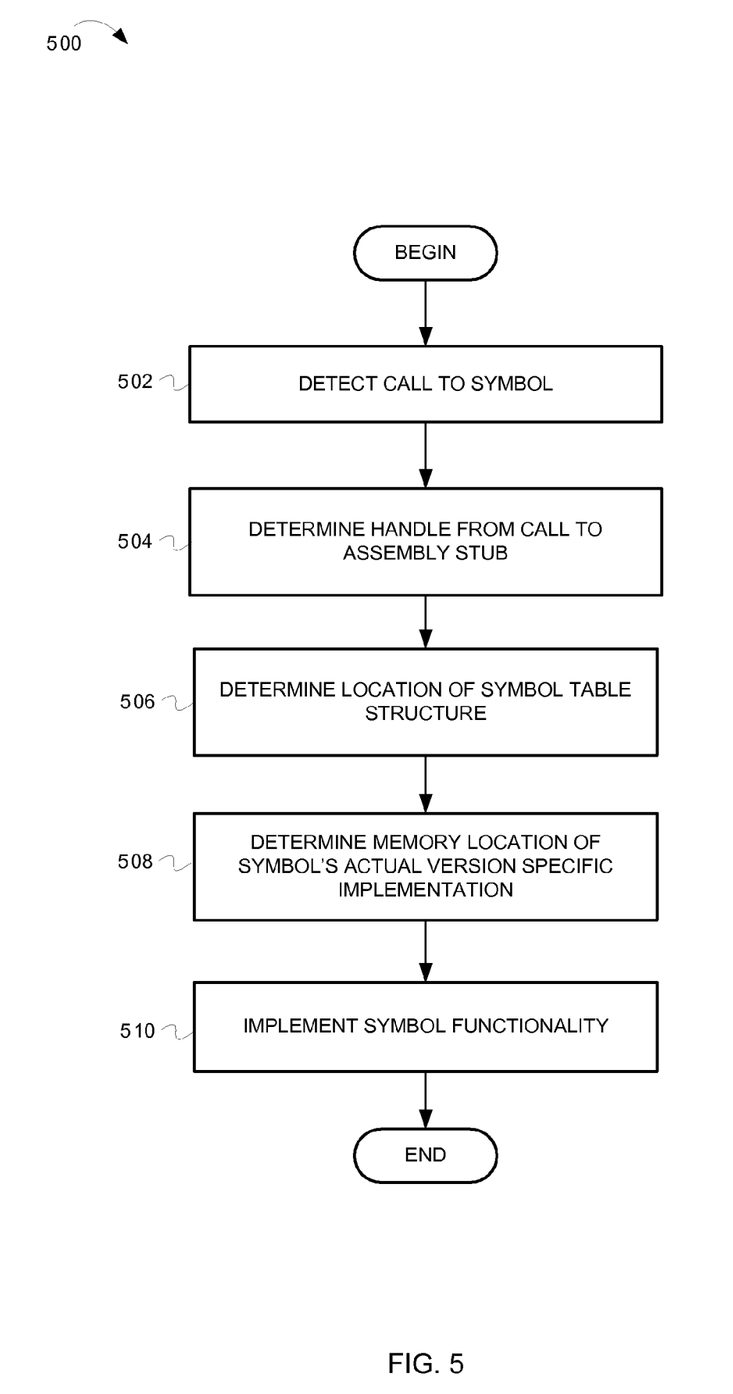
FIG. 5 is a flow diagram illustrating the sequence of events occurring when an application makes a symbol call after assembly stub initialization, according to some embodiments of the invention.

FIG. 5 is a flow diagram illustrating the sequence of events occurring when an application makes a symbol call after assembly stub initialization, according to some embodiments of the invention. The following discussion will describe the flow 500 with reference to the system of FIG. 2. The flow diagram 500 begins at block 502.

Figure 6:
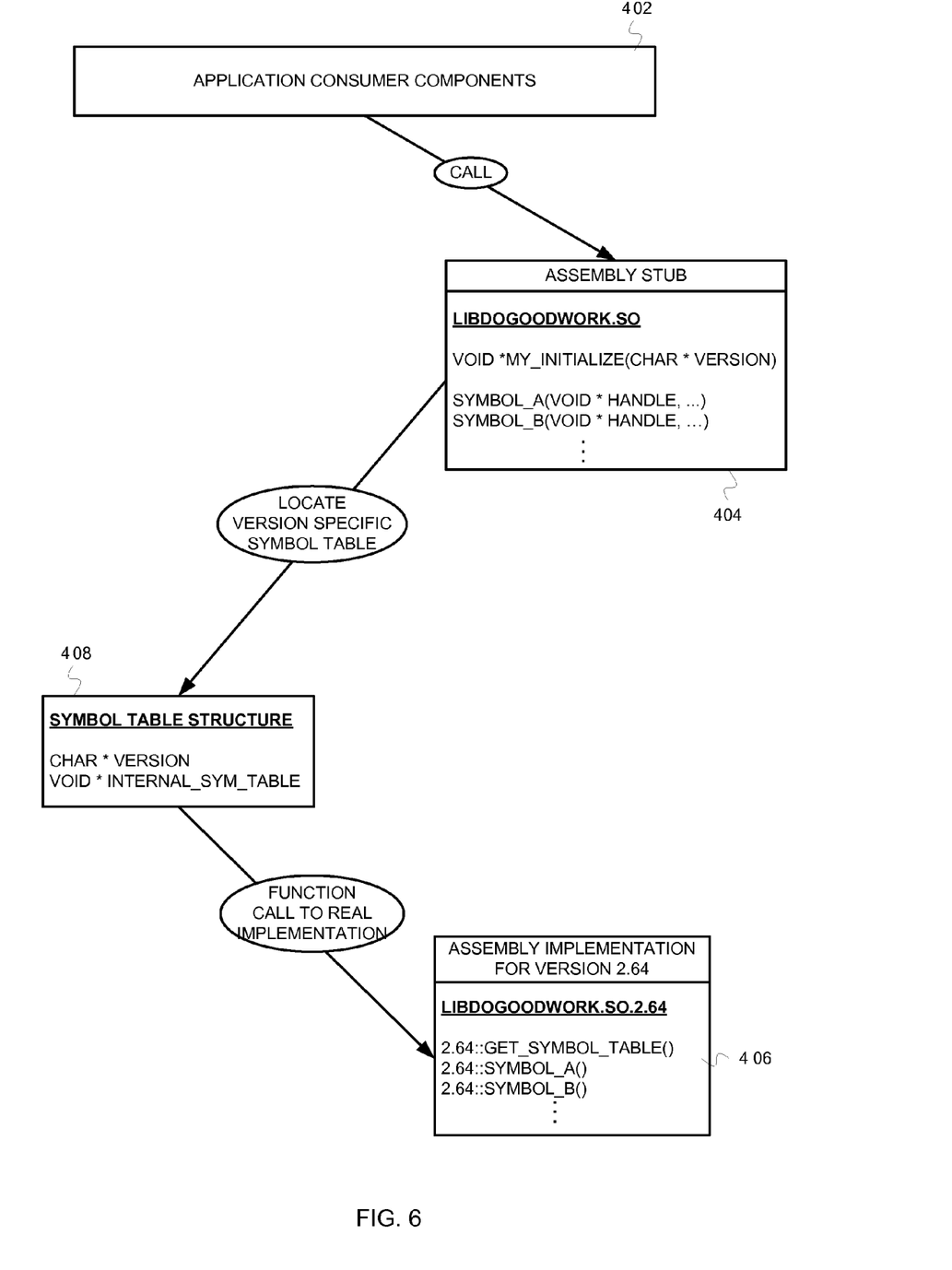
FIG. 6 is a conceptual diagram illustrating the sequence of events occurring when an application makes a symbol call after assembly stub initialization, according to some embodiments of the invention.

At block 502, an assembly stub 204 detects a call to a symbol. In some embodiments, the symbol call can originate from an application consumer component 202. When making a call to a shared assembly's symbol, the application consumer component 202 can provide a handle (e.g., opaque pointer) to ensure that the assembly stub retrieves the appropriate symbol's implementation. This is illustrated in FIG. 6, where an application consumer component 402 makes a function call to the assembly stub 404. For example, if the application consumer component 402 wants to make a call to "symbol_A( )", the function call may be of the form "symbol_A(handle)". Referring back to FIG. 5, the flow continues at block 504.

At block 504, the assembly stub 204 determines the handle from the application component's call. In FIG. 6, the assembly stub 404 receives the handle as part of the call from the application consumer component 402. The assembly stub handle (determined at block 312 in flow 300) defines the location of the shared assembly's version-specific implementation that the application or parts of the application want to use. Referring back to FIG. 5, the flow continues at block 506.

At block 506, the assembly stub 204 uses the handle (passed as a parameter at block 504) to locate the system symbol table structure 406. The handle can be a pointer to a local version of the symbol table (shared assembly implementation) that the application wants to use. For example, the assembly stub 204 may cater to three versions of the shared assembly, each with its own local symbol table. Based on the handle (that the application passes out during a symbol call), the assembly stub 204 can identify which one of the versions the application consumer component 202 want to use. In FIG. 6, the symbol table structure 408 includes shared assembly version information (e.g., version number, version name, etc.) and an internal symbol table structure. The internal symbol table structure includes information (e.g., memory addresses or function pointers) about the actual implementation of each symbol in the shared assembly's specified version. Referring back to FIG. 5, the flow continues at block 508.

At block 508, the assembly stub 204 determines, from the symbol table structure, the memory location of the symbol's actual (version-specific) implementation. In FIG. 6, the assembly stub 404 can retrieve the function pointer for the symbol's real implementation from the internal symbol table structure (determined at block 506). The assembly stub 404 can then make a function call on behalf of the application consumer component 402. Referring back to FIG. 5, the flow continues at block 510.

At block 510, the assembly stub 204 implements the symbol's functionality. The assembly stub 204 uses the function pointer to the symbol's real implementation determined at block 508 and makes a call (on behalf of the application component 202) to the namespaced symbol and the symbol's real implementation. For example, in FIG. 6, the assembly stub 404 uses the function address (e.g., for symbol_A( )) in the internal symbol table 408 and makes a call to the symbol's real implementation 406 (e.g., 2.64::symbol_A( )). From block 510, the flow ends.

Other Assembly Stub Considerations

There are several issues that can arise from the splitting of a shared assembly into an assembly stub and an assembly implementation. In general, assembly stubs maintain a backwards compatible API so that they can grow to accommodate a new API. In some instances, an application consumer component may explicitly load an older version of the assembly stub. The latest version of the assembly implementation may have more functions available than the assembly stub knows about. However, the assembly implementations work properly because the older version of the stub only knows about the older version of the available API. Later, if another consumer component in the process loads a newer version of the stub, the new API symbols will be loaded and resolved into global space from the new assembly stub. When the second consumer component makes a call to the newer API, the new functions may be available as the latest assembly stub knows about the new API and returned the appropriate internal function pointer structure to it when a getSymbolTable( ) function call was made from the old assembly stub.

As another example, suppose that the system includes a new version of the assembly stub, but during the stub initialization (without version information), only an older version of the assembly implementation could be found. When a consumer component makes a call to the new API that the stub knows about, the symbol table (which references an older assembly implementation) pointed to by the handle will not know about the new functions. Thus, the function call via the stub will fail. Thus, in some embodiments, stub initialization fails if the stub does not find an implementation assembly at least the same version as itself or newer. Furthermore, the initialization may also fail if the consumer component requested an implementation version that was older than the stub. The user could then redefine the LD_LIBRARY_PATH so that the newer implementation assembly could be found and then restart the application.

Example Architecture and Operating Environments

Figure 7:
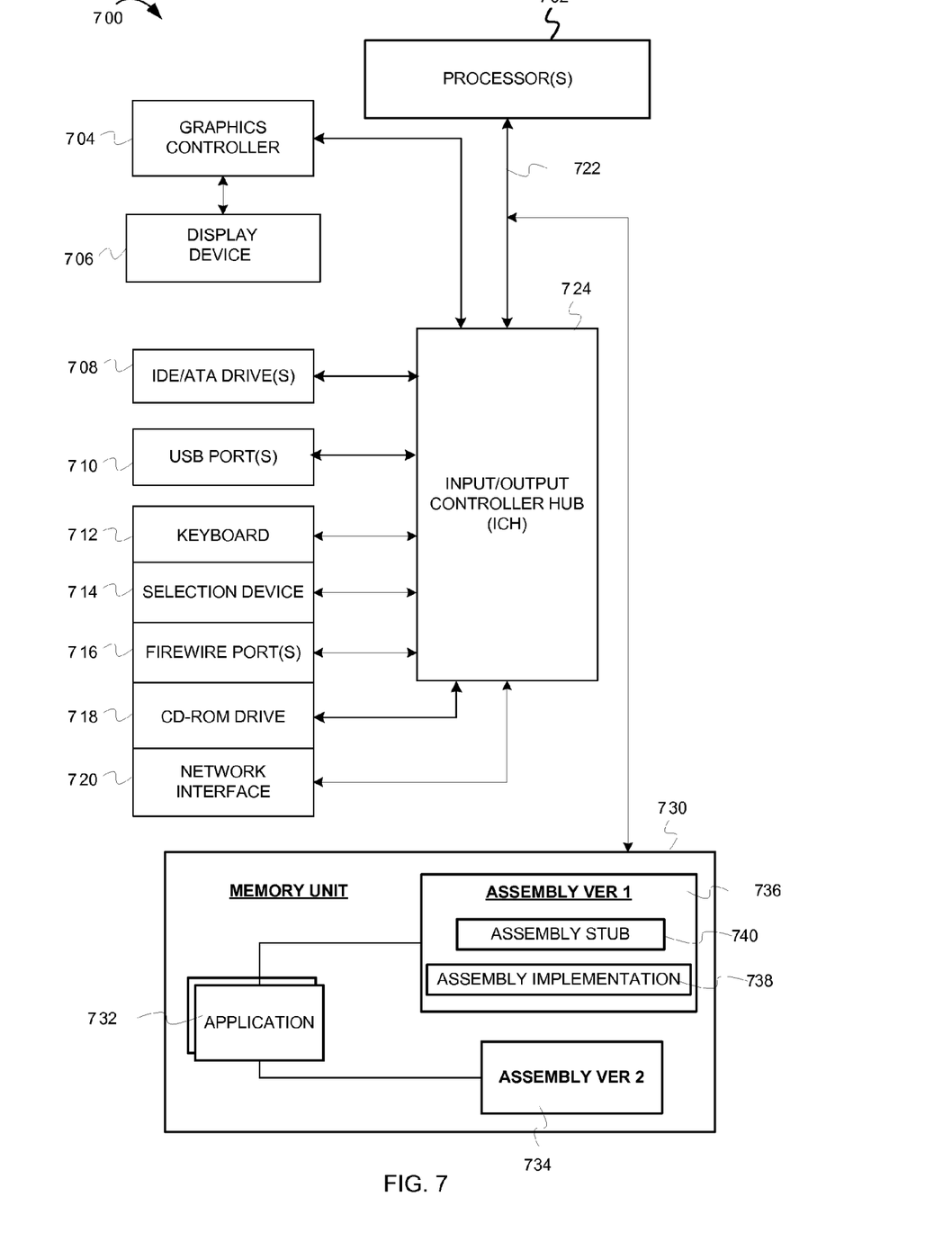
FIG. 7 is a block diagram illustrating a standalone computer system configured to prevent conflicts between different versions of a shared assembly within a single process, according to some embodiments of the invention.

FIG. 7 is a block diagram illustrating a standalone computer system configured to prevent conflicts between different versions of a shared assembly within a single process, according to some embodiments of the invention. The computer system 700 includes a processor 702. The processor 702 is connected to an input/output controller hub 724 (ICH), also known as a south bridge, via a bus 722 (e.g., PCI, ISA, PCI-Express, HyperTransport, etc). A memory unit 730 interfaces with the processor 702 and the ICH 724. The main memory unit 730 can include any suitable random access memory (RAM), such as static RAM, dynamic RAM, synchronous dynamic RAM, extended data output RAM, etc.

In one embodiment, the memory unit 730 includes application programs 732, and multiple versions of shared assemblies 734 & 736. Each version of the shared assembly can include an assembly stub 740 and an assembly implementation 738. The assembly stub 734 is a top-level proxy and includes symbols from the shared assembly that the application needs to call and implement. The assembly stub 734 does not include the actual symbol functionality. The assembly implementation 736 includes the real implementation (e.g., logic to perform the symbol's function) of the shared assembly's symbols. The assembly stub 734 includes an initialization function that may return, to the calling application component, a pointer to the real implementation of the shared assembly version 736. Each symbol in the proxy assembly stub 734 takes this pointer as one the symbol parameters and passes the request down to the correct version of the assembly implementation 736.

The ICH 724 connects and controls peripheral devices. In FIG. 7, the ICH 724 is connected to IDE/ATA drives 708 (used to connect external storage devices) and to universal serial bus (USB) ports 710. The ICH 724 may also be connected to a keyboard 712, a selection device 714, firewire ports 716 (for use with video equipment), CD-ROM drive 718, and a network interface 720. The ICH 724 can also be connected to a graphics controller 704. The graphics controller is connected to a display device (e.g., monitor).

In some embodiments, the computer system 700 can include additional devices and/or more than one of each component shown in FIG. 7 (e.g., video cards, audio cards, peripheral devices, etc.). For example, in some instances, the computer system 700 may include multiple processors, multiple cores, multiple external CPU's. In other instances, components may be integrated or subdivided.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Conclusion

While the embodiments are described with reference to various implementations and exploitations, it will be understood that these embodiments are illustrative and that the scope of the inventive subject matter is not limited to them. In general, techniques for processing symbols associated with shared assemblies are described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An apparatus comprising:
a memory unit including, two or more assemblies, wherein the two or more assemblies include a first assembly and a second assembly, wherein the first and second assemblies are associated with version numbers, wherein the second assembly is a later version of the first assembly, and wherein the first and second assemblies include,
a stub module configured to
detect an assembly initialization request indicating one of the first
or second assemblies, wherein the assembly initialization request's indication of the one of the first or second assemblies one of the version numbers;
retrieve a reference to a symbol table associated with the one of the
first and second assemblies indicated in the assembly initialization request,
store data in the symbol table, and to provide the reference to a caller; and
an implementation module configured to perform operations associated with symbols in the symbol table;
a processor configured to receive and execute the stub module and the implementation module.

2. The apparatus of claim 1, wherein the assembly initialization request's indication of the one of the first or second assemblies includes a null field, and wherein the stub module is further configured to interpret the null field as an indication for the later version of the first assembly.

3. The apparatus of claim 1, wherein the data in the symbol table includes pointers to functions in the implementation module of the one of the first and second assemblies indicated in the assembly initialization request.

4. The apparatus of claim 1, wherein the memory further includes other assemblies that are different versions of the first and second assemblies.

5. The apparatus of claim 1, wherein the memory unit further includes an operating system configured to facilitate the storage of data in the symbol table and execution of the one or more stub and implementation modules.

6. The apparatus of claim 1, wherein the assembly is a subroutine, and wherein the caller is an application.

7. A computer-implemented method for resolving symbols associated with a plurality of versions of a shared assembly, the method comprising:
detecting, via a processor during an invocation of one of the plurality of versions of a shared assembly, a call to an initialization function included in a stub module of the one of a plurality of versions of a shared assembly, wherein each of the plurality of versions of the shared assembly are associated with version numbers, and wherein the invocation indicates one of the version numbers;
retrieving, from a memory device, a reference to a function pointer structure associated with the shared assembly;
storing the function pointer structure in a symbol table associated with the shared assembly, wherein the symbol table includes information associated with the one of the plurality of the versions of the shared assembly, and wherein pointers in the function pointer structure reference an implementation module configured to perform operations associated with symbols in the one of the plurality of versions of the shared assembly; and
returning, for use by a calling component, a reference to the symbol table structure.

8. The method of claim 7 further comprising:
detecting a call to one of the symbols within the one of the plurality of versions of the shared assembly, wherein the call includes the reference to the symbol table;
determining, using the reference to the symbol table structure, a location in memory of the implementation module; and
calling, using the location in memory, the implementation module.

9. The method of claim 7, wherein the assembly initialization request's indication of the one of the plurality of versions of the shared assembly includes a null field, and wherein the stub module is further configured to interpret the null field as an indication for the later version of the shared assembly.

10. The method of claim 7, wherein the data in the symbol table includes pointers to functions in the implementation module of the one of the plurality of versions of the shared assembly.

11. The method of claim 7, wherein the symbols in the implementation module within the one of the plurality of versions of the shared assembly are namespaced using C++ namespaces and build-time macros.

12. The method of claim 7, wherein the assembly initialization request's indication of the one of the plurality of versions of the shared assembly further includes a version name and a version location.

13. One or more non-transitory machine-readable storage device having stored therein a program product, which when executed a set of one or more processor units causes the set of one or more processor units to perform operations, for resolving symbols associated with a plurality of versions of a shared assembly, that comprise:
detecting, during an invocation of one of the plurality of versions of a shared assembly, a call to an initialization function included in a stub module of the one of a plurality of versions of a shared assembly, wherein each of the plurality of versions of the shared assembly are associated with version numbers, and wherein the invocation indicates one of the version numbers;
retrieving a reference to a function pointer structure associated with the shared assembly;
storing the function pointer structure in a symbol table associated with the shared assembly, wherein the symbol table includes information associated with the one of the plurality of the versions of the shared assembly, and wherein pointers in the function pointer structure reference an implementation module configured to perform operations associated with symbols in the one of the plurality of versions of the shared assembly; and returning, for use by a calling component, a reference to the symbol table structure.

14. The non-transitory machine-readable storage device of claim 13 further comprising:

detecting a call to one of the symbols within the one of the plurality of versions of the shared assembly, wherein the call includes the reference to the symbol table;

determining, using the reference to the symbol table structure, a location in memory of the implementation module; and calling, using the location in memory, the implementation module.

15. The non-transitory machine-readable storage device of claim 13, wherein the assembly initialization request's indication of the one of the plurality of versions of the shared assembly includes a null field, and wherein the stub module is further configured to interpret the null field as an indication for the later version of the shared assembly.

16. The non-transitory machine-readable storage device of claim 13, wherein the data in the symbol table includes pointers to functions in the implementation module of the one of the plurality of versions of the shared assembly.

17. The non-transitory machine-readable storage device of claim 13, wherein the symbols within the one of the plurality of versions of the shared assembly are namespaced using C++ namespaces and build-time macros.

* * * * *